United States Patent Office 2,740,690
Patented Apr. 3, 1956

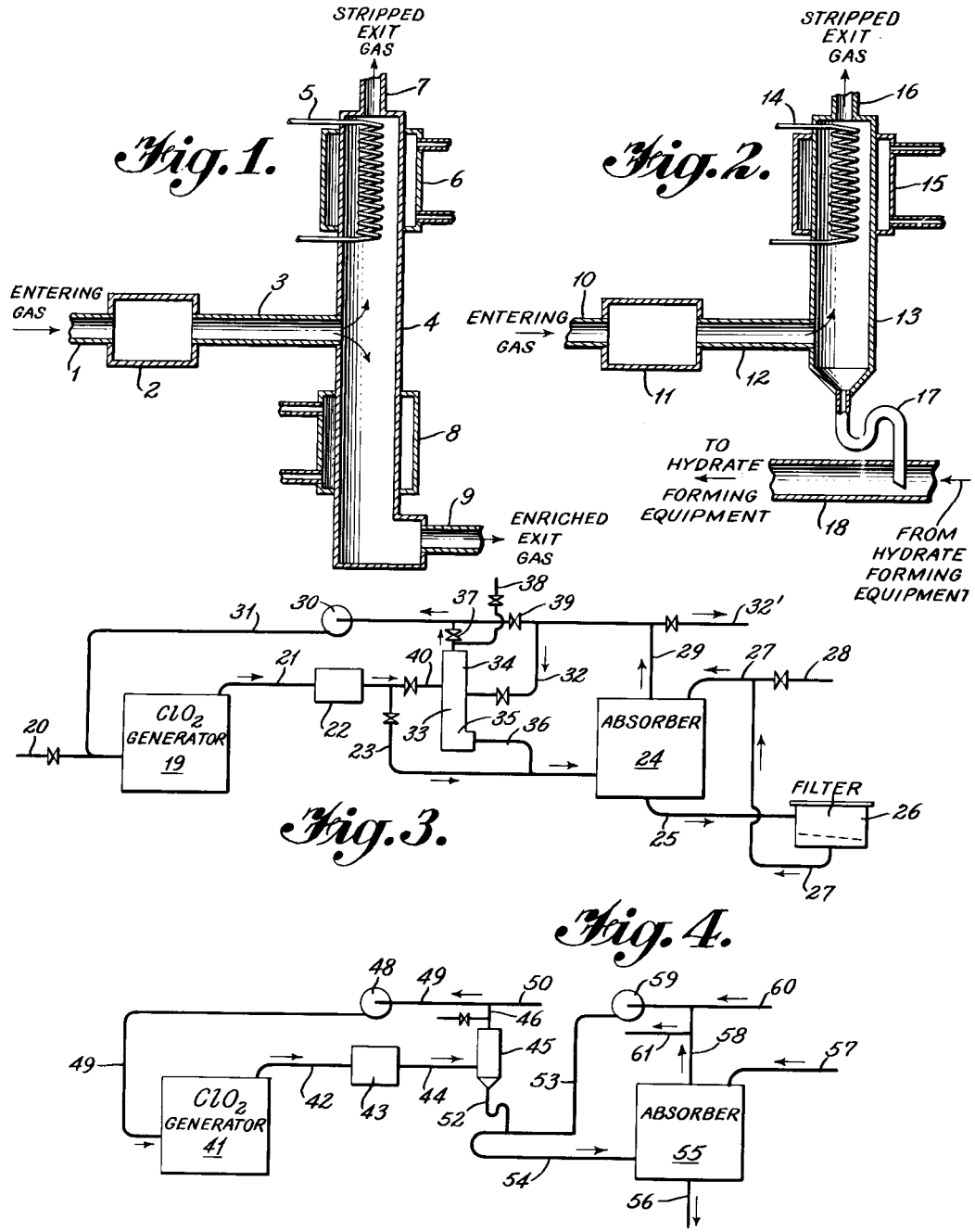

2,740,690

PROCESS FOR MANUFACTURE OF CHLORINE DIOXIDE HYDRATE

Hilding V. Williamson, Chicago, Ill., assignor to Cardox Corporation, Chicago, Ill., a corporation of Illinois Application January 5, 1953, Serial No. 329,644

7 Claims. (Cl. 23—152)

This invention relates to a process for manufacturing chlorine dioxide hydrate. More particularly it relates to an improvement in such a process wherein a lean mixture of chlorine dioxide and a diluent gas is treated to produce a rich mixture of chlorine dioxide and said diluent gas.

In a copending application, Serial No. 266,814, filed January 17, 1952, now United States Patent No. 2,683,-651, there is described and claimed a method for producing chlorine dioxide hydrate. According to this method, a mixture of an inert gas containing from about 7% to 30% by volume of chlorine dioxide is passed through water at a temperature below 15° C. at pressures of about atmospheric to 15 lbs. per sq. in. or more. Chlorine dioxide hydrate crystallizes and separates from the aqueous phase. The partial pressure of chlorine dioxide in the gas mixture must be at least equal to the vapor pressure of chlorine dioxide in the aqueous phase when measured over chlorine dioxide hydrate. The partial pressure of the chlorine dioxide in the gas mixture is in the range of about 100 mm. to about 500 mm. of mercury.

The hydrate formed by this process is free of liquid chlorine dioxide and is remarkably stable. In contrast to liquid chlorine dioxide or highly concentrated gaseous mixtures, the hydrate, when free of liquid chlorine dioxide, cannot be detonated. The solid hydrate in pure form contains about 27% chlorine dioxide. As manufactured commercially, it contains from about 13% to 25% chlorine dioxide, and generally from about 16% to 20% chlorine dioxide, by weight. The hydrate is stored and transported at a temperature below the freezing point of the aqueous phase. At such temperatures the vapor pressure of the hydrate is low and consequently chlorine dioxide is not lost readily through vaporization. The hydrate is normally stored and shipped in the form of blocks, or it is packed in appropriate containers made of corrosion-resistant material such as polyethylene. The shaped hydrate can be stored and shipped in refrigerated or insulated containers.

As used herein, the term "rich gas" refers to a mixture of chlorine dioxide and inert gas, of sufficient concentration to be employed in the hydrate-formation step, the partial pressure of the rich gas being in the range of about 100 mm. to 500 mm. The term "lean gas" refers to one in which the concentration of chlorine dioxide is below that required in the hydrate-formation step, the partial pressure of chlorine dioxide being from about 30 mm. to about 100 mm.

The lean gas from the hydrate-formation step, also referred to herein as the absorption step, may contain from about 5% to 10% of chlorine dioxide, which must be recovered for purposes of economy as well as to avoid creating a nuisance if the gas were to be vented to the atmosphere. Certain processes for manufacturing chlorine dioxide operate at temperatures and pressures such that a rich gas cannot safely be produced. These are examples of lean gases which are treated according to this invention.

It is an object of this invention to treat lean gases which are not suitable for direct use in the hydrate-forming step, to produce a rich mixture of chlorine dioxide and inert gas therefrom which is suitable for use in the hydrate-forming step.

The chlorine dioxide may be generated by any suitable method. Such methods are described in United States Reissue Patent 23,111 and United States Patent 2,489,572. Other methods are well-known in the art and need not be described in detail.

The invention is further illustrated in the accompanying drawings, of which

Figure 1 is an apparatus in sectional elevation, suitable for the gas-concentrating step;

Figure 2 illustrates another modification of apparatus useful in the gas-concentrating step;

Figure 3 is a flow diagram of a process for manufacturing chlorine dioxide hydrate employing the concentrating step;

Figure 4 is a flow diagram of a chlorine dioxide hydrate manufacturing process of modified form.

Referring to Figure 1, a lean gas is supplied through line 1 to drier 2. The drier may contain any suitable drying agent which is not reactive with chlorine dioxide hydrate. These include silica gel, activated alumina, sulfuric acid and the like. The reagent may also be capable of removing part or all of the chlorine which may be contained in the gas. One suitable reagent is soda lime. The lean gas from the absorber is generally saturated with water, while gases from the generator may contain entrained acid particles, which are also removed. If not so treated, ice may form in the concentrator. The dry gaseous mixture passes through line 3 to the concentrator column 4. The concentrator comprises two zones. In the upper zone is a cooling coil 5. The zone may be provided with a jacket 6, through which an appropriate cooling medium is circulated to assist in the cooling and condensing of the chlorine dioxide. A portion of the vapors pass upwardly through the cooling zone, which is maintained at a temperature generally in the neighborhood of about −10° C. to −40° C. Any suitable temperature for condensing the chlorine dioxide may be used. However, since chlorine dioxide solidifies at −59° C., the temperature must be maintained above that point. The stripped gas, which may contain minor amounts of chlorine dioxide (generally less than 3% by volume) passes out through line 7. As will be pointed out more fully hereinafter, this gas may be returned to the chlorine dioxide generator as a diluent gas, or may be passed through a solution of sodium hydroxide to recover the chlorine dioxide as sodium chlorite.

The chlorine dioxide liquifies and passes downwardly into the revaporizing zone of column 4. The lower part of column 4 may be equipped with a heating jacket 8 through which a heating medium is passed to maintain a temperature sufficient to vaporize the liquid chlorine dioxide. The remaining portion of gas which is not passed through the cooling or condensing zone, passes downwardly through the revaporizing zone, as indicated by the arrow, assisting in the vaporization of the liquid chlorine dioxide, to form an enriched gas which passes out of the apparatus through line 9. The temperature in the revaporizing zone need not be high, generally being above 0° C., to about 25° C.

The apparatus is preferably of such a design that the liquid chlorine dioxide drops from the coil and/or flows as a film over the column walls from the condensing zone to the revaporizing zone immediately after being condensed. Instead of the coil, vertical cooling fins may be employed. They should be of such a design that there is little or no tendency for the liquid to hold up. In this way, the chlorine dioxide is condensed, then flows at once to the revaporizing zone and is revaporized therein in a matter of seconds after it is condensed. Thus there is a minimum of liquid in the system at all times. In larger plants, it is preferable to use a number of small concentrating units, and distribute the lean gas among them, rather than to use one large concentrator.

The proportion of gas passing through the condensing zone, and that passing through the revaporizing zone, is regulated so that the enriched exit gas will contain chlorine dioxide in the proportions of about 12% to 25%, and generally of the order of about 15% to .25% by volume. The exact proportioning is a function of the concentration of the incoming gas, the amount condensed therefrom in the condensing zone, and the desired concentration in the enriched gas. The rich gas is passed to the absorber, as will be more fully explained hereinafter.

Referring to Figure 2, the lean gas passes through line 10 to the scrubber or drier 11, thence through line 12 to column 13. In this case all of the gas passes upwardly into the cooling and condensing zone containing a coil 14 and which may be additionally jacketed by a cooling jacket 15. A suitable cooling medium is passed through the jacket and the cooling coil to effect condensation of the chlorine dioxide. The stripped gas passes out of the concentrator through line 16. The liquid chlorine dioxide collects in the bottom of column 13 and passes through a liquid seal in line 17 and thence into line 18, where it is mixed with a diluent gas in proportions suitable to produce a rich gas of the concentrations necessary for use in the hydrate-formation step. Line 18 may be jacketed and warmed to assist in vaporizing the chlorine dioxide. The apparatus is generally of such proportions that the amount of liquid chlorine dioxide in column 13 and in the gooseneck 17 is sufficiently small that should it detonate, it would not destroy the equipment. As a precaution, a rupture plate or other relief (not shown) may be placed at any suitable point, for example, in line 16.

The apparatus illustrated in Figures 1 and 2 is designed so that the quantity of chlorine dioxide in liquid form is small at any given time. This is necessary in order to avoid serious damage from explosions which might accidentally occur.

Figure 3 is a schematic representation of a chlorine dioxide hydrate manufacturing process employing the gas concentrating principles of the invention.

Referring to Figure 3, a chlorine dioxide generator is generally indicated at 19. Any suitable type of generator may be used, such as one of those referred to above. A diluent gas from line 20 is passed through the generator, where it mixes with chlorine dioxide, and the mixture is passed through line 21 to drier 22. If a rich gas is produced in the generator, it passes through line 23 to the absorber 24. The absorber may be of any suitable design, and contains water. It is maintained at a temperature in the above-indicated range, being above the freezing point of the aqueous phase and generally at a temperature of about 0° to +3° C. More than one absorber may be used. According to one embodiment, a slurry of chlorine dioxide hydrate crystals suspended in a concentrated solution of chlorine dioxide in water is withdrawn through line 25 to a filter 26. The filter 26 may comprise a vessel having a slanting screen near the bottom thereof to permit the aqueous phase to drain from the crystals. The filter box may be equipped with a tightly fitting cover. When the box becomes full of chlorine dioxide hydrate crystals, the cover may be removed and the crystals removed therefrom.

The aqueous phase from filter 26 passes through line 27 and is returned to the absorber 24. Additional water may be added through line 28. Water is consumed in the process because it combines to form the chlorine dioxide decahydrate. A certain amount of water remains occluded to the crystals collected in filter 26.

The lean gases from the absorber pass through line 29, and a portion or all of them may be passed through fan 30 and line 31 to the chlorine dioxide generator 19, wherein they serve as a sweep gas. Line 32' is provided to remove the lean absorber gases should this be desirable. After the plant is in operation, only enough diluent gas is, as a rule, added through line 20 to make up for that which may be lost.

Part or all of the lean gases from line 29 may be passed through line 32 to concentrator 33, which, as illustrated in this figure, is similar to that described in connection with Figure 1. The major portion of the chlorine dioxide in the lean gases from the absorber is condensed in the condensing zone 34 of the concentrator, passed downwardly to the revaporizing zone 35, and enriched gas passes from the bottom of the concentrator through line 36 which joins with line 23, and thence into absorber 24. The stripped gases from concentrator 33 pass through line 37 which joins with line 31, and may be used as a sweep gas in the generator 19. A portion or all of the stripped gas from concentrator 33 may be removed through line 38 and vented to the atmosphere, or scrubbed with caustic soda to remove the chlorine dioxide contained therein. In the preferred operation the valve 39 is closed and all of the lean gas from the absorber is passed through line 32 to the concentrator 33. In this case a part or all of the stripped gas is passed through line 37 and line 31 and returned to the generator 19.

If the concentration of chlorine dioxide in the gases emerging from generator 19 through line 21 is below that required for use in the absorber 24, the gas from drier 22 is passed through line 40 to the concentrator 33, wherein it is concentrated in the manner as described in connection with the lean absorber gases. The stripped gases are used as a diluent gas in generator 19, and preferably all of the lean absorber gases are subjected to the concentrating step as previously described.

Referring to Figure 4, a chlorine dioxide generator 41 is diagrammatically illustrated. In this embodiment the mixture of chlorine dioxide and diluent gas emerging from the generator through line 42 contains less chlorine dioxide than is necessary for use in the absorber; that is, the partial pressure of chlorine dioxide is less than 100 mm. The mixture passes through the drier 43 and thence through line 44 to concentrator 45, which is of the type illustrated and fully described in connection with Figure 2. Chlorine dioxide is condensed in the upper part of column 45, and stripped gases are removed through lines 46, 47, fan 48 and line 49, being returned to generator 41 for use as a diluent gas. Additional diluent gas may be added through line 50. A portion of the stripped gas may be removed from the system through line 51.

Liquid chlorine dioxide passes through the gooseneck 52 and is vaporized by means of lean absorber gas entering through line 53. The enriched gas passes through line 54 to absorber 55, wherein chlorine dioxide hydrate is formed as previously described. The slurry of chlorine dioxide hydrate may be removed through line 56 and separated as previously described. The aqueous phase and/or make-up water may be supplied to absorber 55 through line 57. The lean absorber gas is removed through line 58, fan 59, and thence through line 53, where it is combined with liquid chlorine dioxide, which vaporizes and is passed to the absorber. Additional inert diluent gas such as air, nitrogen, carbon dioxide and the like, may be introduced through line 60. A portion of the lean absorber gas may be removed through line 61.

Other modifications of apparatus and of means for employing such apparatus in the chlorine dioxide hydrate system will be readily apparent to one skilled in the art, and it is not my intention to be limited to the exact modifications illustrated and described.

I claim as my invention:

1. A process for producing non-explosive chlorine dioxide hydrate substantially free of liquid chlorine dioxide, which comprises generating chlorine dioxide gas in a generating step, simultaneously diluting it with an inert gas, passing the resultant dilute gas mixture to a concentrating step, cooling a portion of said dilute gas mixture to condense chlorine dioxide therefrom, returning the stripped gas to the generation step, vaporizing the condensed chlorine dioxide with the remainder of said dilute gas mixture to form an enriched gas containing chlorine dioxide vapor in proportions such that the partial pressure of chlorine dioxide therein is at least 100 mm., but below 500 mm. of mercury, absorbing chlorine idoxide from said enriched gas in a saturated aqueous solution of chlorine dioxide at a temperature below about 15° C. and above the freezing point of the aqueous phase to form chlorine dioxide hydrate, separating the gas from this absorption step, returning it to the generation step, and recovering the hydrate formed.

2. A process for producing non-explosive chlorine dioxide hydrate substantially free of liquid chlorine dioxide, which comprises generating chlorine dioxide gas in a generating step, simultaneously diluting it with an inert gas, passing the resultant gas mixture to a concentrating step, cooling the gas mixture to condense liquid chlorine dioxide therefrom, removing the stripped gas from the concentrating step, vaporizing the condensed chlorine dioxide with an inert gas to form a rich gas mixture containing from 100 to 500 mm. partial pressure of chlorine dioxide, and passing the rich gas into an absorption zone into contact with water at a temperature below 15° C. and above the freezing point of the aqueous phase to form chlorine dioxide hydrate, and recovering said hydrate.

3. A process for making non-explosive chlorine dioxide hydrate substantially free of liquid chlorine dioxide which comprises forming a first gas stream comprising chlorine dioxide of less than about 100 mm. of mercury partial pressure, dehydrating the stream, passing the dry stream to a condensing zone, continuously condensing chlorine dioxide from the stream, continuously and immediately passing the condensed chlorine dioxide into a contiguous vaporizing zone maintained at a higher temperature than the condensing zone, continuously passing a stream of diluent gas therethrough to vaporize said chlorine dioxide at the same rate at which it is condensed, the volume of said gas being less than the volume of the first gas stream but in an amount sufficient to form a rich gas mixture containing from 100 mm. to 500 mm. partial pressure of vaporized chlorine dioxide, and absorbing chlorine dioxide from the rich gas in a saturated aqueous solution of chlorine dioxide at a temperature below 15° C. and above the freezing point of the aqueous phase to form chlorine dioxide hydrate.

4. A process for producing non-explosive chlorine dioxide hydrate substantially free of liquid chlorine dioxide which comprises generating chlorine dioxide gas in a generating step, simultaneously diluting it with an inert gas to form a gas containing chlorine dioxide at a partial pressure of 100 to 500 mm. of mercury, passing said gas into an absorption zone and absorbing chlorine dioxide therefrom in a saturated aqueous solution of chlorine dioxide at a temperature below 15° C. and above the freezing point of the aqueous phase to form chlorine dioxide hydrate, separating gas having reduced chlorine dioxide content from the absorption zone, dividing it into two streams, cooling one of said streams to condense chlorine dioxide therefrom, vaporizing the condensed chlorine dioxide with the second of said streams to form a gas containing chlorine dioxide at a partial pressure of 100–500 mm. of mercury and passing it to said absorption step.

5. A process for producing non-explosive chlorine dioxide hydrate substantially free of liquid chlorine dioxide which comprises generating chlorine dioxide gas in a generating step, simultaneously diluting it with an inert gas to form a gas containing chlorine dioxide at a partial pressure of 100–500 mm. of mercury, passing the gas to an absorption zone into contact with water at a temperature below 15° C. and above the freezing point of the aqueous phase to form chlorine dioxide hydrate, separating the gas having reduced chlorine dioxide content from said absorption zone, dividing it into two streams, cooling one of said streams and condensing liquid chlorine dioxide therefrom, passing gas from the cooling step to the generating step as the diluent gas therein, vaporizing the condensed chlorine dioxide with the second of said streams to form a gas containing chlorine dioxide at a partial pressure of 100–500 mm. of mercury and passing the resultant gas to said absorption zone.

6. A process for producing chlorine dioxide hydrate which comprises generating chlorine dioxide in a generating zone, simultaneously diluting it with an inert gas, passing the dilute gas from the generating step to a concentrating zone, cooling the gas mixture to condense liquid chlorine dioxide, separating the gas from the cooling step and returning it to the generating zone as the diluent gas, vaporizing the liquid chlorine dioxide in a vaporizing zone with gas from an absorption zone to form a gas mixture containing chlorine dioxide at a partial pressure of 100–500 mm. of mercury, passing the resultant gas mixture to an absorption zone and absorbing chlorine dioxide therefrom in water at a temperature below about 15° C. and above the freezing point of the aqueous phase to form chlorine dioxide hydrate, removing gas of reduced chlorine dioxide content from said absorption zone, and passing it to the vaporizing zone as the gas for vaporizing liquid chlorine dioxide therein.

7. A process for producing non-explosive chlorine dioxide hydrate substantially free of liquid chlorine dioxide which comprises generating chlorine dioxide in a generating step, simultaneously diluting it with an inert gas to form a gas mixture containing chlorine dioxide at a partial pressure of 100–500 mm. of mercury, passing the resultant gas mixture to an absorption zone into contact with water at a temperature below 15° C. and above the freezing point of the aqueous phase to form chlorine dioxide hydrate, separating gas of reduced chlorine dioxide content from said absorption zone, cooling last said gas to condense liquid chlorine dioxide therefrom, removing the gas from the cooling step, vaporizing the condensed chlorine dioxide with an inert gaseous diluent to form a gas containing chlorine dioxide at a partial pressure of 100–500 mm. of mercury and passing the resultant gas to said absorption zone.

References Cited in the file of this patent

UNITED STATES PATENTS 2,683,651    Williamson et al. _____ July 13, 1954

OTHER REFERENCES

Lange's Handbook of Chemistry, Fifth ed., pages 174–175, 178, 179, pages 214–215; published by Handbook Publishers, Inc., Sandusky, Ohio.

J. W. Mellor's "A Comprehensive Treatise on Inorganic and Theoretical Chem.," vol. 2, 1922 ed., pages 289, 290; Longmans, Green and Co., New York, N. Y.